May 30, 1967 T. S. SPRAGUE ET AL 3,322,643
HEAT TRANSFER APPARATUS ARRANGEMENT
Filed April 20, 1964 3 Sheets-Sheet 1

INVENTORS
John H. Ammon
BY Theodore S. Sprague

ATTORNEY

May 30, 1967   T. S. SPRAGUE ET AL   3,322,643
HEAT TRANSFER APPARATUS ARRANGEMENT
Filed April 20, 1964   3 Sheets-Sheet 2
FIG. 3
FIG. 4
FIG. 5
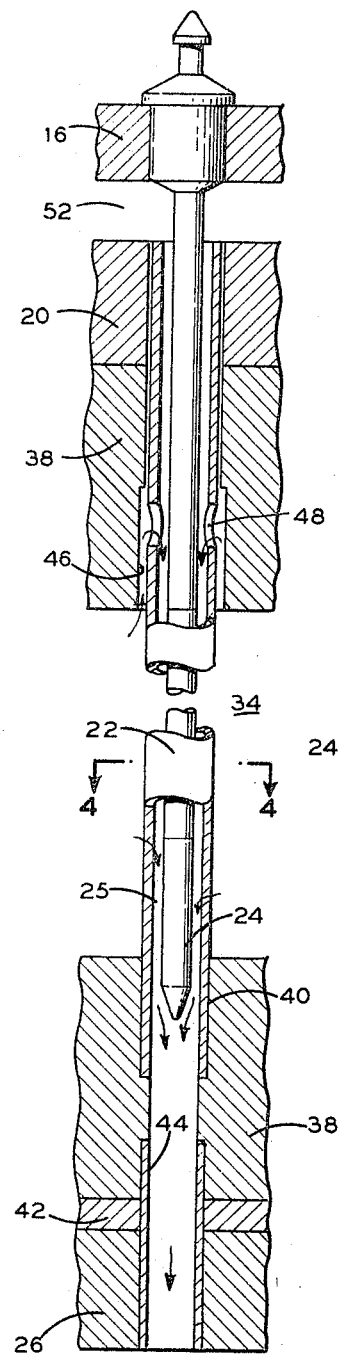
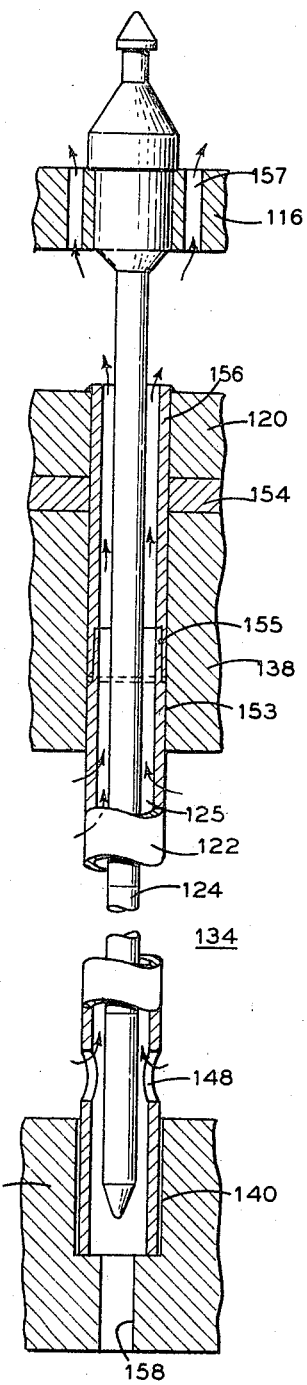

United States Patent Office 3,322,643
Patented May 30, 1967

3,322,643
HEAT TRANSFER APPARATUS ARRANGEMENT
Theodore S. Sprague, Hudson, and John H. Ammon, Akron, Ohio, assignors to the Babcock & Wilcox Company, New York, N.Y., a corporation of New Jersey
Filed Apr. 20, 1964, Ser. No. 361,123
10 Claims. (Cl. 176—59)

This invention relates in general to heat transfer apparatus and more specifically to a nuclear reactor wherein the chain reaction generated neutrons are moderated by a mass of cooling fluid which is thermally insulated from the fuel elements, which cooling fluid after moderating these neutrons is passed in direct heat transfer contact with the fuel elemnts to remove the heat generated thereby and transport it to a point of use.

As disclosed in co-pending application Ser. No. 197,060, filed May 23, 1962, now Patent No. 3,247,073, it has been found that a very advantageous method of operating a nuclear reactor is to moderate, cool and control the reactor with a coolant such as steam whereby the reactor is moderated by the coolant in a space surrounding tubes containing the fuel elements after which the coolant passes through the tubes in direct heat transfer contact with the fuel elements therein. In order to provide the required moderation it is necessary to insulate the coolant in the moderating space from the coolant within the fuel element-containing tubes. This is necessary because, in normal operation, the temperature of the coolant in the moderator space should be maintained at a predetermined temperature according to the operating conditions of the reactor to assure the constant steam density necessary for the required amount of neutron moderation. Should the temperature of the coolant vary, the density thereof would also change resulting in a variation from the moderation of the chain reaction. Thus the insulation of the moderating portion of the coolant is necessary to assure the operating stability of the reactor. One method of insulating the moderator space is to line the tubes containing the fuel elements with an insulating material; however in such a reactor as disclosed in the above-identified co-pending application, this is a difficult problem since this reactor utilizes supercritical steam at temperatures as high as 1050° F., which prevents the use of ordinary insulating material. One method contemplated for insulating the coolant in the fuel element-containing tubes from that in the modertaing space is the use of multiple thin layers of metal foil or a metal wool lining for the fuel element-containing tubes. However, this method has the disadvantage of increasing the amount of neutron absorbing material in the reactor core which reduces the efficiency of the reactor by reducing the number of neutrons available for promoting the chain reaction. Another method contemplated for insulating the coolant in the fuel element-containing tubes from that in the moderating space is by the use of a thin jacket surrounding and spaced from the outer surface of the fuel element-containing tubes, which space is filled with stagnant coolant which would theoretically act as a thermal insulator. This method of insulating the fuel element-containing tubes is not completely satisfactory due to the fact that, over an extended operating period, the stagnant layer of coolant tends to become heated to the temperature of the coolant within the tubes and eventually provides no insulating properties whatever.

Accordingly, the present invention provides a novel method of reducing the heat transfer from the coolant space within the heating element-containing tubes to the space surrounding these tubes whereby the heating element-containing tubes are formed of a pervious material such as porous graphite so that a small portion of the coolant fluid in the space surrounding the tubes continuously passes through the pores of the graphite tubes removing heat therefrom and maintaining them at a substantially lower temperature than the coolant fluid flowing therethrough.

Accordingly, the present invention provides a nuclear reactor having a multiplicity of longitudinally parallel tubes arranged therein for the passage of the fluid therethrough, a multiplicity of fissionable material-bearing fuel elements are disposed within the tubes forming a substantially annular flow space between the elements and the tubes, a fluid flow opening in one end of the tubes between the annular flow space and the exterior of the tubes, the tubes being pervious to the fluid, means for passing a cooling fluid in contact with the outer surface of the tubes whereby a major portion of the fluid enters the annular flow space through the opening in one end thereof and flow therethrough in heat transfer contact with the fuel element and the remaining portion of the fluid passes through the pervious tube maintaining the temperature of the tube below the temperature of the major portion of fluid in the annular flow space.

Furthermore, the present invention provides a nuclear reactor wherein the tubes containing the fuel elements are formed of porous graphite.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:

FIG. 3 is an enlarged detail of a fuel element and its associated fuel element-containing tube of the reactor illustrated in FIG. 1;

FIG. 4 is a cross-section of a fuel element and tube taken along lines 4—4 of FIG. 3;

FIG. 5 is an enlarged detail of a fuel element and its associated fuel element-containing tube of the reactor illustrated in FIG. 2;

Figure 1:
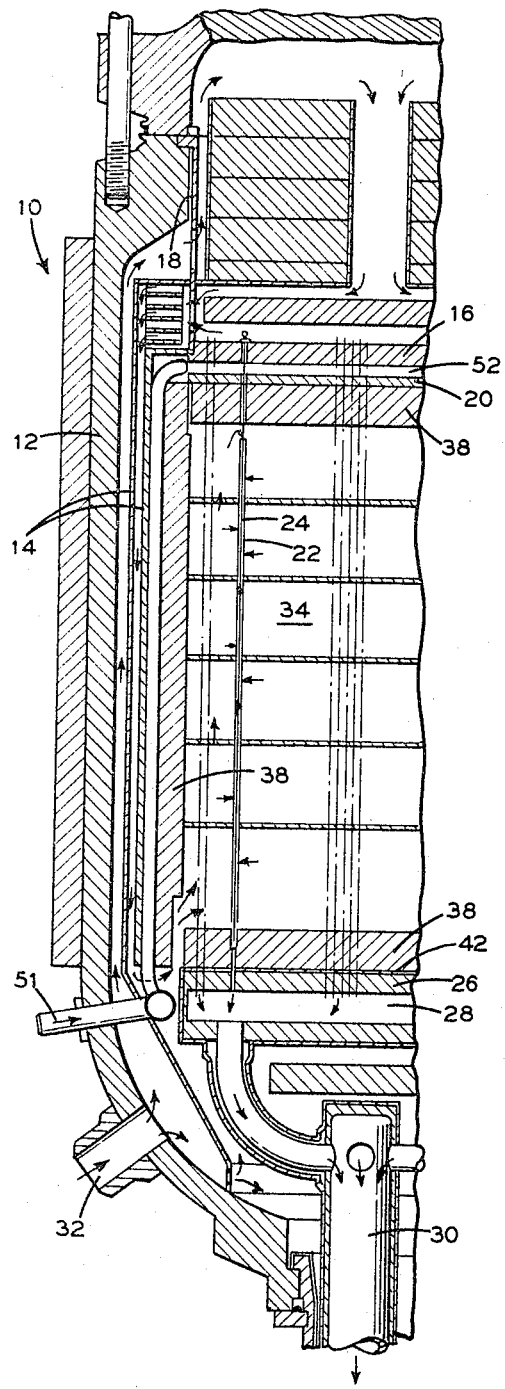
FIG. 1 is a partial vertical section of a nuclear reactor constructed according to the present invention.

A heat transfer apparatus, and more specifically a nuclear reactor 10, incorporating the present invention is illustrated in FIG. 1 and comprises a vertically elongated cylindrical pressure vessel 12 having a plurality of spaced thermal shields 14 concentrically arranged adjacent the inner surface of the pressure vessel which operate in a manner well known in the art to protect the pressure vessel from high temperatures and radiation damage. An upper tube sheet 16 is suspended in the upper portion of the pressure vessel by a cylindrical support member 18. A secondary upper tube sheet 20, which supports and aligns a plurality of pervious tubes 22, is suspended from tube sheet 16, in a manner well known in the art. A plurality of heating elements 24 are suspended in these tubes from tube sheet 16, preferably with one heating element in each tube. In a nuclear reactor these heating elements are nuclear fuel-bearing elements of a type well known in the art. The lower ends of tubes 22 are supported in and aligned by a lower tube sheet 26 which forms the upper portion of an outlet plenum chamber 28 which, in turn, is supported in the lower portion of the pressure vessel by an outlet conduit arrangement 30. A coolant inlet 32 is arranged in the lower portion of the pressure vessel 12 for the introduction of a coolant fluid into the reactor.

The reactor core area 34, which is defined by tube sheets 20 and 26, is lined with a neutron reflector material 38 in a manner well known in the art.

A detail of the fuel element-containing tube arrangement is illustrated in FIG. 3 wherein it is seen that the pervious tube 22 is supported by and aligned within a counterbore 40 formed in the lower reflector material 38, which reflector material is supported by the lower tube sheet 26. This reflector material is separated from the lower tube sheet by a layer of insulation material 42 to minimize the conduction of heat from the outlet plenum chamber 28 to the core area 34. An outlet passage liner 44, aligned with tube 22 and concentric with counterbore 40, extends through the lower reflector material 38, the insulation material 42, and the lower tube sheet 26 thereby permitting the passage of heated coolant from the annular flow passage 25 to the outlet plenum chamber 28. The pervious tube 22 extends upwardly through the core area 34, through the upper portion of reflector material 38, and terminates in the upper tube sheet 20. A counterbore 46 is provided in the lower surface of the upper reflector material 38 to permit the passage of the coolant fluid from core area 34 into one or more openings 48 in the upper portion of tube 22.

The fuel elements 24 are suspended from tube sheet 16 and are positioned concentrically with respect to tubes 22 forming an annular flow passage 25 therebetween. Each fuel element extends substantially throughout the length of its associated tube 22, ending some distance above tube sheet 26. The fuel element may be centered within the tube by a plurality of radial ribs 50 which extend inwardly from the inner surface of tube 22, as seen in FIG. 4, and extend substantially throughout the length thereof.

An auxiliary coolant inlet 51 is provided through the pressure vessel for introducing a coolant fluid into a decay-heat coolant inlet plenum 52, situated between upper tube sheets 16 and 20, and thence through the upper ends of tubes 22 to annular flow space 25 to assist in removing decay heat generated after the reactor is shut down and the main coolant system is stopped. The open upper end of tube 22 permits the introduction of the decay-heat coolant, but since the decay-heat coolant inlet plenum 52 is closed during normal reactor operation little, if any, coolant will flow from opening 48 upwardly to the plenum 52 during normal reactor operation.

The reactor coolant fluid, which in the above-identified co-pending application is steam, is introduced into the reactor through inlet 32, the major portion of which circulates through the thermal shields 14 and thence into the lowermost portion of the core area 34. A small portion of the entering coolant fluid passes upwardly between the thermal shields 14 and the inside wall of the pressure vessel 12, thereby cooling the pressure vessel, then around the upper head area of the pressure vessel and thence back to the bottom of the core area 34. The coolant fluid then flows upwardly through the core area in the flow space outside of tubes 22 to the opening 48 provided in each of the tubes 22 and on into the annular flow space 25 associated with each of the tubes 22. In flowing through the annular space 25 the coolant is in direct heat transfer contact with the fuel elements 24. Upon flowing downward through the annulus the fluid passes through lower tube sheet 26 to the outlet plenum 28, and thence through the outlet conduit 30 to a point of use, not shown. In flowing through the core area 34, exterior of tubes 22, the coolant is maintained at a temperature of approximately 600° F. and moderates the neutrons there present to the extent necessary to sustain and control the chain reaction and in subsequently flowing through the annular flow space 25 it is heated by direct contact with fuel elements 24 to a temperature of approximately 1050° F.

As noted above, it is necessary to maintain the coolant surrounding the exterior of tubes 22 at a much lower temperature than the coolant within the flow spaces 25. Thus, it is necessary to minimize the heat transfer from the high temperature coolant fluid in the annulus 25 to the lower temperature coolant fluid which surrounds tubes 22. The present invention provides such insulation by constructing tubes 22 of a material pervious to the coolant effect fluid so that a small portion of the coolant flowing along the outer surface of tubes 22 passes through the tube wall and into the annular flow passage 25 thereby maintaining the wall temperature at a substantially lower temperature than that of the coolant flowing through the flow spaces 25. For example, using tubes 22 formed of porous graphite, a small portion of the coolant will flow through the pores of the graphite from the outer surface to the inner surface of the tubes, cooling the tube wall and maintaining the outer surface of the tubes at a temperature substantially equal to the temperature of the coolant in the moderating space surrounding the tubes. The inner surface of the tubes will be maintained at a temperature between the temperature of the coolant passing through the tube wall and that at the outside surface of the tubes as a result of the characteristic thin boundary layer of coolant which is formed along the inner surface of the tubes. This boundary layer is at a lower temperature than the major portion of the coolant within the tube wall and thus assists in maintaining the tube temperatures below that of the major portion of the coolant. However, since this boundary layer or film is very thin and comprises but a small portion of the total coolant flow through the tubes, the coolant forming the boundary layer will continuously mix with the main portion of the coolant flowing in annulus 25, with little effect on the temperature of the main coolant flow leaving the tubes 22.

Figure 2:
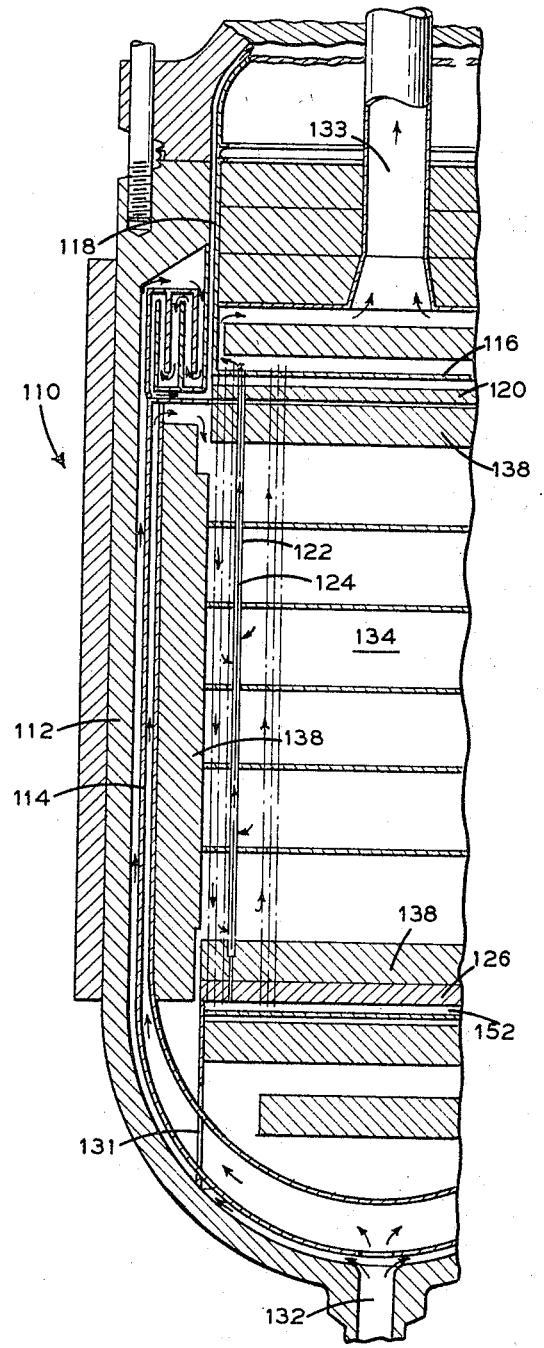
FIG. 2 is a partial vertical section of an alternative arrangement of a nuclear reactor constructed according to the present invention.

An alternate arrangement of a nuclear reactor 110 incorporating the present invention is illustrated in FIG. 2. Insofar as possible, elements of this arrangement which substantially correspond to similar elements in the arrangement illustrated in FIGS. 1 and 3 are given the same reference numerals but with the prefix 1. In this arrangement the coolant is introduced an inlet 132 in the bottom of the reactor and flows upwardly between the pressure vessel wall 112 and the thermal shield 114. At the top of the thermal shield 114 the major portion of the coolant enters the top of the core area 134, flowing downwardly therethrough while a small portion is circulated around the upper head area of the pressure vessel.

Referring now to FIG. 5, an enlarged detail of a fuel element 124 and fuel element-containing tube 122 of this arrangement is illustrated. In this arrangement the fuel element-containing tube 122, formed of a pervious material, is supported and aligned by a counterbore 140 in the upper surface of the lower reflector material 138. The tube extends upwardly through the core area 134 and terminates in a bore 153 which extends through the upper reflector material 138, the secondary upper tube sheet 120 and a layer of insulating material 154, disposed between the upper reflector material 138 and the secondary upper tube sheet 120. The insulating material minimizes the conduction of heat from the outlet coolant to the core area 134. The upper end of tube 122, which terminates within the upper reflector material is provided with an expansion joint 155 having a tubular insulating member 156 which extends the remaining distance through bore 153 and is secured, as by welding to the upper surface of the secondary tube sheet 120.

In this arrangement the coolant entering the core area 134 flows downwardly therethrough with a major portion entering the bottom of tube 122 through one or more openings 148 formed therein. A minor portion of the coolant flowing through core area 134 passes through the pervious tube 122 in the same manner as described with respect to the arrangement of FIG. 1. The coolant flows upwardly through the annular flow space 125 formed between the fuel element 124 and the tube 122 in direct heat contact with the fuel element, thence through openings 157 in upper tube sheet 116 and leaves the reactor through outlet 133 (FIG. 2) to a point of use, not shown. A passage 158 is provided through the lower reflector material 138 and the lower tube sheet 126, which is supported from the lower portion of the pressure vessel 112 by a support skirt 131, for the introduction of decay-heat cooling fluid from plenum 152 in a manner similar to that previously described.

Figure 6:
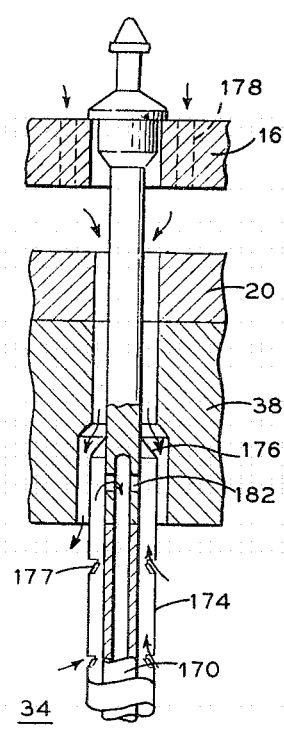
FIG. 6 is an enlarged detail of an alternative arrangement of a fuel element and a fuel element-containing tube for use in the reactor illustrated in FIG. 1.
Figure 6:
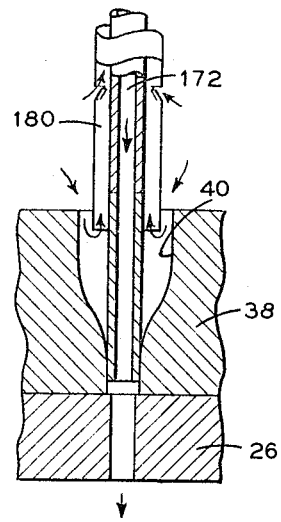

FIG. 6 illustrates an alternative arrangement of a fuel element and fuel element-containing tube which may be used in the reactor illustrated in FIG. 1. In this arrangement the fuel element 170 is suspended from the upper tube sheet 16, passing through the secondary tube sheet 20 and the upper reflector material 38 and terminating in the lower tube sheet 26. This fuel element is annular in shape having a central flow passage 172 extending throughout a major portion of the length of the fuel element. The fuel element-containing tube 174 of this arrangement is supported by the fuel element and is connected thereto as by a conical element 176 near the upper end of the fuel element and terminates within the counterbore 40 in the lower reflector material 38. The fuel element-containing tube 174 in this arrangement is formed of a thin sheet of low neutron absorbing material, such as zirconium, having a multiplicity of small openings 177 formed therein. In this arrangement the insulating characteristics of the tube 174 are achieved solely by the boundary layer on the inner surface of the tube formed by that portion of the coolant which flows through the openings. The coolant passes through openings 178 formed in the upper tube sheet 16 passing downwardly through the annulus formed by the bore in the secondary tube sheet 20 and the upper reflector material 38 and the fuel element 170 and enters the core space 34. The major portion of the coolant in the core space enters the lower end of tubular element 174 while a minor portion passes through the multiple openings 177 formed in the wall of the tube. The coolant then flows upwardly within the annular flow passage 180 formed between the tube 174 and the fuel element 170 and at the upper end of the fuel element passes through openings 182 and enters the central flow passage or channel 172 of the fuel element. The coolant then flows through the center channel 172 to the outlet of the reactor, not shown.

Figure 7:
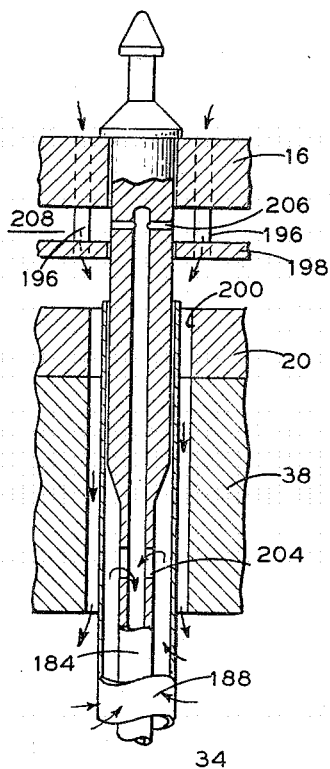
FIG. 7 is an additional alternative arrangement of a fuel element and a fuel element-containing tube for use in the reactor illustrated in FIG. 1.
Figure 7:
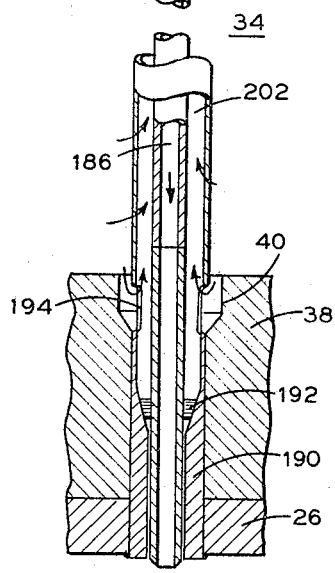

An additional alternative arrangement of the fuel element incorporating the present invention is illustrated in FIG. 7 wherein a fuel element 184 having a centrally disposed flow passage 186 is suspended from the upper tube sheet 16, the element passing through a suitably sized bore in the secondary upper tube sheet 20 and in the upper reflector material 38, finally terminating in the lower tube sheet 26. The fuel element-containing tube 188 extends upwardly from the bottom tube sheet 26 to which it is connected and through the lower reflector material 38 encircling the fuel element 184 and forming an annular flow passage 202 therebetween, and terminates in the upper tube sheet 20. The lower end of tube 188 has an enlarged wall thickness 190 forming a reduced inside diameter in which the lower end of fuel element 184 terminates. A sealing ring 192 is disposed between the lower end of the fuel element 184 and the enlarged portion 190 of the fuel element-containing tube to prevent any leakage of coolant through the clearance space between the fuel element and fuel element-containing tube. A plurality of openings 194 are formed in the lower end of the fuel element-containing tube adjacent the counterbore 40 which is formed in the upper surface of the lower reflector material 38.

In this arrangement the coolant enters the core area 34 through tubular members 196 which extend through the upper tube sheet 16 and tube sheet 198 spaced intermediate the upper tube sheet 16 and the secondary upper tube sheet 20. The coolant then flows through an enlarged bore or annular opening 200 surrounding the upper end of the fuel element-containing tube 188 through the secondary upper tube sheet 20 and the upper reflector material 38 to the core area 34. The major portion of the circulating coolant enters the lower end of the fuel element-containing tube 188 by way of openings 194 and flows upwardly through the annular flow passageway 202. A minor portion of the coolant passes through the porous wall of the fuel element-containing tube in the manner previously described to insulate the inner surface of the tube from the core area 34. The coolant then flows upwardly along the outer surface of the annular fuel element 184 absorbing heat therefrom and passes through openings 204 formed through the fuel element wall near the upper end thereof to the central flow passage 186. The coolant then flows downwardly through the fuel element to the lower end thereof where it is removed from the reactor to a point of use not shown.

In this arrangement decay heat cooling fluid may be introduced into the center flow channel 186 through openings 206 formed through the wall of the fuel element at the top thereof, which openings communicate with the decay-heat coolant plenum 208 formed between tube sheets 16 and 198.

The fuel element-containing tube 188 in this arrangement is formed of porous graphite having an outer covering sheath (not shown) formed of a low neutron absorbing material, such as zirconium, which is provided with a plurality of fine openings to permit the passage of a small portion of the coolant fluid therethrough.

As previously noted, the arrangement of the present invention provides a means for insulating the heated coolant in contact with the fuel element from that portion of the coolant exterior of the fuel element-containing tube which is used for moderation purposes. By the use of porous graphite as the fuel element-containing tube the amount of neutrol absorbing material in the core of the reactor is minimized. Graphite has the additional advantage that it is also a neutron moderator which is not affected by the high temperature coolant and which has a high compressive strength at high temperatures. Furthermore, in manufacturing the fuel element-containing tubes of porous graphite, the porosity thereof may be varied. Porosity may even be varied throughout the length of the tubes should it be desired to vary the amount of coolant used for insulation purposes throughout the length of the fuel element.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:
1. Heat transfer apparatus comprising an elongate tube, a heating element disposed and extending longitudinally within said tube and forming a substantially annular fluid flow path between said heating element and the inner surface of the wall of said tube, means defining a fluid flow opening in one end of said tube, said fluid flow opening providing direct communication between said fluid flow path and the exterior of said tube, means for passing a fluid over and in contact with the outer surface of the wall of said tube in one direction and thence through said fluid flow opening and thence through said annular path in a direction opposite to said one direction in heat exchange relationship to said heating element and in contact with the inner surface of the wall of said tube, and means for effecting transpiration cooling of the wall of said tube along substantially its entire length to inhibit heat transfer from the fluid within said annular path to the fluid outside said tube, said last named means including means forming a multiplicity of pores along the length of said tube, whereby a portion of said fluid passes through said pores to thereby maintain the wall of the tube below the average temperature of the fluid within said fluid flow path and to effect the establishment of a thin boundary layer of relatively cool fluid on the inner surface of said tube.

2. Heat transfer apparatus according to claim 1 wherein said tube is formed of porous graphite pervious to said fluid.

3. A nuclear reactor comprising means defining a core area, a tube extending through said core area, a fissionable material bearing fuel element disposed and extending longitudinally within said tube and being laterally spaced from the inner wall of said tube to form a fluid flow path between said fuel element and the inner surface of the wall of said tube, means defining a fluid flow opening in one end of said tube, means for passing a fluid through said core area over and in contact with the outer surface of the wall of said tube in one direction and thence through said opening and thence through said fluid flow path in a direction opposite to said one direction in heat exchange relationship with said fuel element and in contact with the inner surface of the wall of said tube, and means for inhibiting heat transfer from the fluid within said fluid flow path to the fluid outside said tube, said last named means including means for forming a thin boundary layer of relatively cool fluid along the inner surface of said tube, said layer forming means including means forming a multiplicity of small openings along substantially the entire length of said tube, said openings being of such a size and arrangement that a portion of said fluid flows directly through the wall of said tube effecting cooling thereof and tends to remain in close proximity to the inner surface of said tube.

4. A nuclear reactor according to claim 3 wherein said fluid is the primary neutron moderator in said core area.

5. A nuclear reactor according to claim 3 wherein said multiplicity of openings are pores for effecting transpiration cooling of the wall of said tube.

6. A nuclear reactor according to claim 5 wherein said tube is formed of porous graphite pervious to said fluid, and a plurality of said tubes and said fuel elements are disposed in parallel relation in said core area.

7. A nuclear reactor according to claim 6 wherein said fluid is steam.

8. A nuclear reactor according to claim 5 wherein the extent of perviousness of said tube varies along the length thereof.

9. A nuclear reactor comprising means defining a core area, a tube extending through said core area, an annular fissionable material bearing fuel element disposed and extending longitudinally within said tube and being laterally spaced from the inner wall of said tube to form an annular fluid flow path between said fuel element and the inner surface of the wall of said tube, means defining a fluid flow inlet opening in one end of said tube, means defining an outlet opening in said fuel element at the same end of said tube as said inlet opening, means for passing a fluid through said core area over and in contact with the outer surface of the wall of said tube and thence through said inlet opening of said tube and thence through said fluid flow path in heat exchange relationship with said fuel element and in contact with the inner surface of the wall of said tube and thence through said fuel element to the outlet thereof, and means for inhibiting heat transfer from the fluid within said fluid flow path to the fluid outside said tube, said last named means including means forming a multiplicity of openings along the length of said tube, said openings being of such a size and arrangement that a portion of said fluid flows directly through the wall of said tube effecting cooling thereof and forms a thin boundary layer of relatively cool fluid along the inner surface of said tube.

10. A nuclear reactor according to claim 9 wherein said fluid is the primary neutron moderator in said core area, said multiplicity of openings are pores for effecting transpiration cooling of the wall of said tube, and a plurality of said tubes and said fuel elements are disposed in parallel relation in said core area.

References Cited
UNITED STATES PATENTS

| 1,881,041 | 10/1932 | Benjamin. | |
| 2,985,575 | 5/1961 | Dennis et al. | 176—81 X |
| 3,085,964 | 4/1963 | Ritz et al. | 176—60 X |
| 3,089,837 | 5/1963 | Moore | 176—61 X |
| 3,111,475 | 11/1963 | Davidson | 176—81 X |
| 3,205,147 | 9/1965 | Foure et al. | 176—61 |
| 3,247,073 | 4/1966 | Schluderberg | 176—59 |

FOREIGN PATENTS

| 1,179,037 | 12/1958 | France. |
| 935,092 | 8/1963 | Great Britain. |

L. DEWAYNE RUTLEDGE, *Primary Examiner.*